Figure 1:
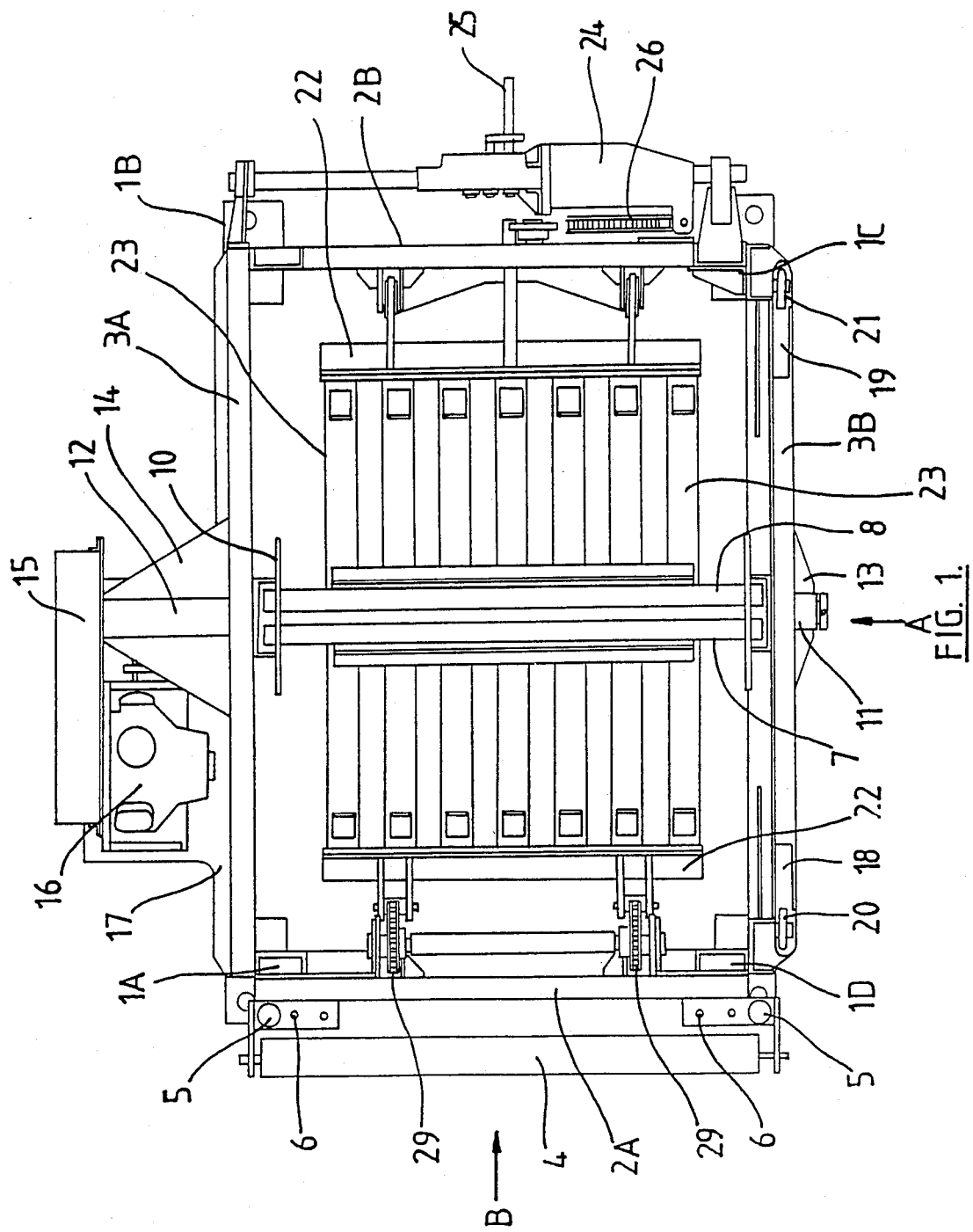

United States Patent [19]

Wozniak

[11] Patent Number: 4,735,373
[45] Date of Patent: Apr. 5, 1988

[54] CONVEYOR-BELT REELING DEVICES

[75] Inventor: Jan Wozniak, Isle of Man, Isle of Man

[73] Assignee: Serni Limited, Isle of Man, Isle of Man

[21] Appl. No.: 893,472

[22] Filed: Aug. 5, 1986

[51] Int. Cl.$^4$ ............................................. B65H 18/02
[52] U.S. Cl. .................................... 242/67.1 R; 242/79
[58] Field of Search ................... 242/67, 67.1 R, 67.2, 242/68.7, 76, 78.7, 79, 81, 115, 116

[56] References Cited

U.S. PATENT DOCUMENTS

| | | | |
|---|---|---|---|
| 2,503,995 | 4/1950 | Bouget | 242/79 |
| 2,569,589 | 9/1951 | Trissell | 242/67.1 R |
| 2,738,138 | 3/1956 | Russell | 242/81 |
| 3,557,591 | 1/1971 | Lind | 242/78.7 |
| 3,817,475 | 6/1974 | Goldstein | 242/115 |
| 3,834,643 | 9/1974 | St. Sauveur et al. | 242/76 X |
| 4,099,682 | 7/1978 | Benuska | 242/67.1 R X |

FOREIGN PATENT DOCUMENTS 0908638 8/1972 Canada .

Primary Examiner—John M. Jillions
Assistant Examiner—Steven M. DuBois
Attorney, Agent, or Firm—Louis E. Marn

[57] ABSTRACT

There is disclosed a conveyor-belt reeling device comprised of an open box frame having vertical rollers laterally adjustable at one end, and an axle or mandrel comprised of collapsible members, each end of which is positioned within suitable recesses provided in circular discs wherein one end of the axle extends through the frame for connection to a drive mounted externally to the frame and wherein the other end of the axle is positioned within a pivotally mounted opposite frame member and wherein a cradle including rollers is provided which extends across the width of the frame capable of raised or lowered by means of an integral lifting apparatus.

7 Claims, 3 Drawing Sheets

CONVEYOR-BELT REELING DEVICES

In installations of conveyor-belt transport systems, there are several occasions when it is necessary to remove some or all of the belting, for example, when the conveyor system is no longer required, the complete installation has to be dismantled prior to being dispatched to a new location this involves dividing up the belting into easy manageable lengths, rolling these lengths up into compact rolls and securely binding each roll for ease of handling and transporting. In another instance, lengths of belting become torn or badly worn and so need to be removed and replaced by lengths of new belting, in this instance, the length of worn belting has to be circulated and located in a suitable position—usually near to the drive-end of the conveyor—here, the return belting beneath the conveyor structure is cut from the main body of the belting and is rolled into bundles as the belting is discharged from the drive unit, when the other end of the damaged belting passes through the drive, this too is cut from the main body of the belting thereby allowing the roll to be bound with rope or wire in readiness to loading on to transport. In a further situation, the length of the conveying installation has to be reduced, this in turn requires that a length of belting has to be removed in a manner similar to that described above.

Whichever of the afore-mentioned situations arise, the task of rolling up the lengths of belting is very slow because the heavy weight and cumbersome size of the roll of belting means that workmen cannot manually turn the roll at the same speed as it is being discharged from the conveyor drive unit, this part of the operation is further encumbered by the very restricting space to be found beneath the conveyor structure so allowing only a few men to carry out the rolling operation, when a length of belting is eventually rolled up and bound, the task of moving the roll from under the structure and placing it adjacent to the structure and then completing the whole operation by lifting the roll onto some means of transport, means the expenditure of time and effort is out of proportion with the results achieved.

These tasks have been alleviated to some extent by means of conveyor-belt reeling machines, such machines are known but basically they accomplish only one of the tasks—that of reeling the belting into a roll as it passes from the conveyor drive unit. In one type, a simple frame is located beneath the conveyor structure, across the width of the frame is an axle, either end of which is located within a bearing which is split into an upper and a lower half, one end of the axle may be fitted with a hand-operated crank or may be coupled via gearing to a motor drive, when sufficient belting has been reeled on, the upper halves of the split bearings are removed so allowing the axle and roll to be lifted out and be deposited on the floor beneath the conveyor structure. In another variation, the main support frame incorporates a secondary frame which is pivotally attached to the first or main frame, this secondary frame contains an axle or mandrel upon which the belting is reeled, the axle may be manually turned or may be driven by a suitable motor and gearing, when sufficient belting has been reeled onto the axle, it is cut away from the remainder of the belting and is then bound up in order to keep it in a compact bundle, securing pins which hold the two frames together are then removed so allowing the second frame to pivot forward so depositing the roll on the floor beneath the conveyor structure.

In both of the machines described, there is no means of controlling the lateral direction of the belting as it is fed at speed from the conveyor drive unit, this can result in the formation of an unbalanced roll in which the belting travels sideways across the axle and may foul the side members of the frame and the resultant roll is unstable and likely to unwind when removed from the axle, likewise, in both machines the completed rolls of belting are deposited on the floor beneath the conveyor structure from where they have to be manually manoeuvred within the confines of space previously described, to a location adjacent to the conveyor structure thereafter, there still remains the task of lifting the rolls onto the transport provided. The manner in which the belting is attached to the axle at the commencement of reeling, is to place the leading edge of the belting next to the axle until sufficient turns have been made to ensure that the belting will adhere to it by frictional means, a problem arises however when all of the belting is wound on and it is desirable to remove the axle from the centre of the roll, it is often found that the tension on the belt during winding or reeling plus the heavy weight of the belting itself makes the operation of this task almost impossible, thereby adding to the handling and transport problems.

The present invention relates to reeling devices onto which can be wound lengths of conveyor belting and has for its object an improvement therein such that the belting issuing from the conveyor drive unit will be controlled in both the vertical and horizontal planes to ensure that the roll of belting reeled onto the axle will be symmetrical and there-after be stable when bound and removed from the axle; one of the side members of the reeling frame contains one of the axle bearings and is pivotally attached to one of the vertical members of the frame, thereby allowing the roll of belting to be discharged sideways, while in addition, the device will incorporate a lifting device such that the height of the completed roll of belting can be adjusted to suit the height of a receiving form of transport and will have a base composed of rollers to ease the operation of transference; the axle itself will comprise twin longitudinal members whereby the leading end of the belting will be located between the said members, when the reeling is complete, these two members can be collapsed and easily withdrawn from the centre of the roll. From the above, it can be seen that the disadvantages set out in the description of known belt reeling machines will be overcome.

According to the present invention, a conveyor belt reeling device comprising an open box frame having horizontal rollers and vertical rollers which are laterally adjustable at one end, an axle or mandrel having a central portion composed of collapsible members each end of which is located within suitable recesses provided in circular discs, one end of the axle extending through a side member of the frame for connection to a drive mounted external to the frame while the other end of the axle is located within a pivotally mounted opposite frame member, a cradle extends across the width of the frame and has a base containing rollers, such a cradle being capable of being raised or lowered by means of an integral lifting apparatus.

In actual use, the belt reeling device is placed in a convenient position in respect to the conveyor, the leading edge of the length of belting which is to be wound, is placed between the horizontal rollers at one end of the frame, the vertical rollers at each end are then adjusted laterally to suit the width of the belting, this combination of rollers ensures that the disposition of the belting is controlled during winding and the resultant roll is symmetrical. The leading edge of the belting is then placed between two opposing U channel cross-sectional beams which comprise the longitudinal central portion of the axle, these beams are so arranged that the flanges are opposite to each other and a short distance apart and they are held in that position by placing the ends of the beams into cut-outs of identical shape and configuration provided in circular discs at each end of the beams, from the outer sides of these discs, one cylindrical axle protudes through a bearing located in one of the upper longitudinal members of the frame and is connected via gearing to a driving motor, the other cylindrical axle protrudes from the outer face of the other disc and is located within a bearing attached to the other upper longitudinal member of the frame, this member is pivotally attached to both adjoining vertical members of the frame thereby allowing it to hinge open such that the roll of belting can be discharged from the side of the frame, during the winding operation, the pivotal member is held in the closed position by securing pins which also form a part of the hinges. When the roll of belting is completed and has been bound to prevent it from unrolling, the cradle having rollers in its base and being located on the base of the frame, is raised by the lifting apparatus in order to carry the weight of the roll, the hinged side member of the frame is opened in which-ever direction is most suitable for the particular installation, by removing one of the two securing pins and the roll of belting is moved sideways along the rollers in the base of the cradle, the height of the cradle having first been adjusted to suit the height of the receiving transport. As the side frame member is hinged open, the two U sectional beams which comprise the central portion of the axle are withdrawn from the recesses in the circular discs, they can easily be extracted from the centre of the roll.

In order that the invention may be fully understood and readily carried into effect, a prefered embodiment thereof will now be described, by way of example only, in which:

FIG. 1. shows a Plan View of the invention.

Figure 2:
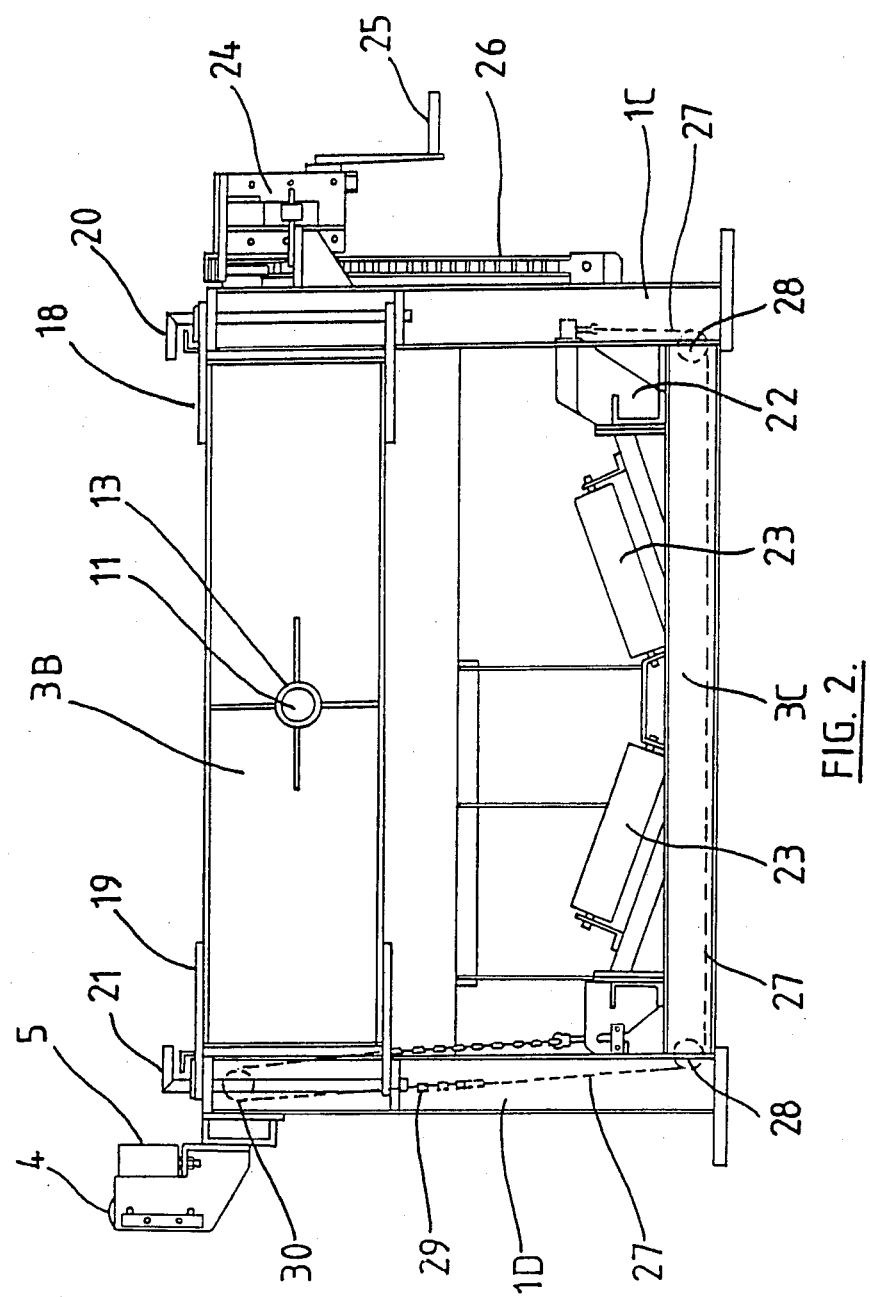

FIG. 2. shows a Front Elevational View of the invention in the direction of the arrow A shown in the Plan View.

Figure 3:
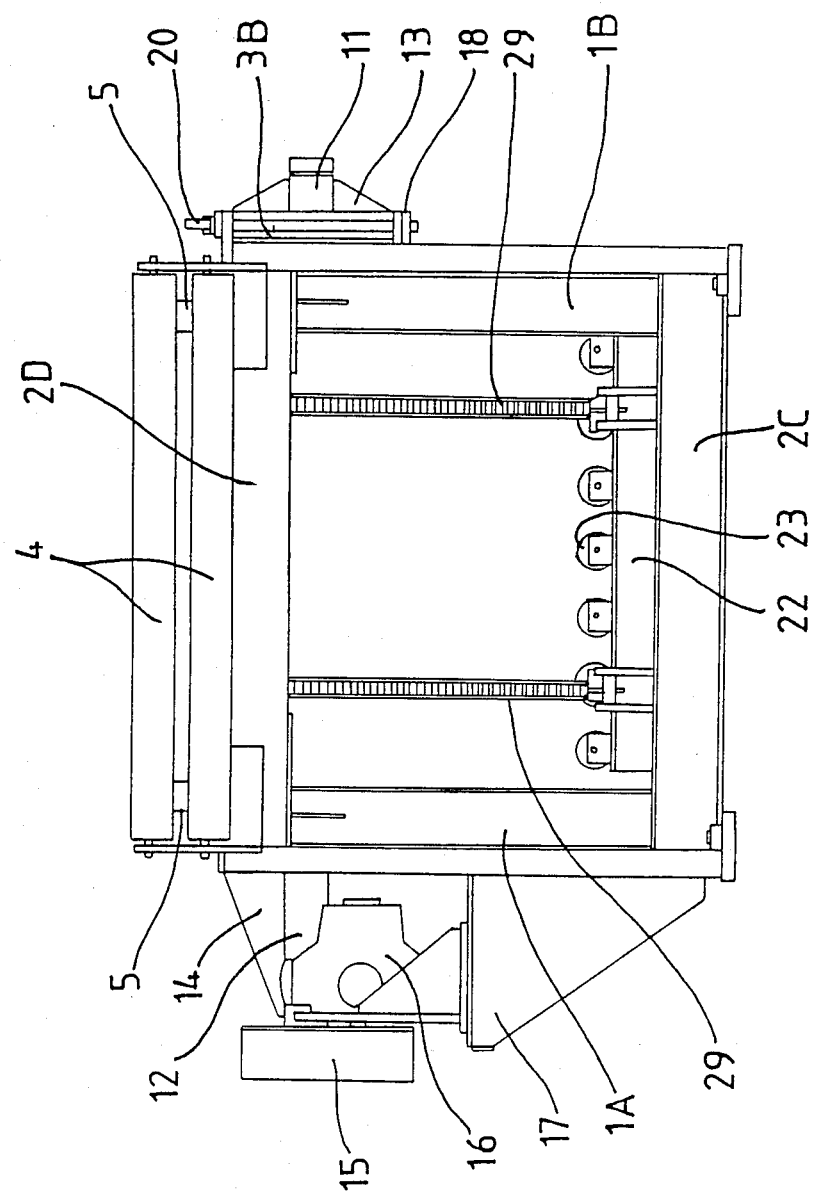

FIG. 3. shows an End Elevational View of the invention in the direction of the arrow B shown in the Plan View.

The open box frame is composed of at least four vertical leg members 1A,1B,1C and 1D, the horizontal tie members being 2A,2B,2C and 2D while the longitudinal members 3A,3B,3C and 3D. Attached to the upper face of the tie member 2A are parallel horizontal rollers 4 between which the leading edge of the belting is passed, the two vertical, side rollers 5 are capable of being of being located in holes 6 in order to accomodate varying widths of belting which may be wound, the central portion of the axle onto which the belting is to be wound, consists of two U channel cross-sectional beams 7 and 8, so placed that their respective flanges are opposite to one another and a short distance apart so that the leading edge of the belting is placed within the gap, the beams are held within shaped recesses (not shown), provided in the inner facing surfaces of circular discs 9 and 10, from the outer facing surfaces of these discs extend cylindrical axles 11 and 12. axle 11 terminates within a bearing 13 which is attached to the longitudinal frame member 3B, from the outer face of disc 10, extends a cylindrical axle 12 which passes through a bearing 14 attached to the longitudinal frame member 3A, the end of this axle is connected via gearing 15 to a drive motor 16 mounted on platform 17. The frame member 3B is pivotally attached to vertical frame members 1C and 1D by means of hinges 18 and 19 and are held in the closed position during the belt reeling operation by pins 20 and 21. Within the centre of the frame is a cradle 22 having inclined rollers 23 in its base, the cradle and rollers being at right-angles to the longitudinal members of the frame, the cradle is capable of being raised or lowered by means of a lifting apparatus 24 actuated by means of a crank handle 25, chain 26 issuing from the lifting apparatus is attached to one end of the cradle and the movement is transmitted to the other side of the cradle by means of ropes 27 via pulleys 28 acting upon lifting chain 29 which passes around sprocket 30.

What we claim is:

1. A conveyor-belt reeling device comprising:
    an open box frame structure of a width and length including upper parallelly-disposed frame members positioned along said length thereof;
    an axle extending traversely to said width of said box frame structure, one end of said axle protruding through one of said upper horizonal frame member, the opposite end of said axle being located within said opposite frame member, said opposite frame member being pivotally attached at each end and capable of pivotal movement in either direction to permit lateral transference of said axle and associated roll of belting, a drive means mounted external of said frame and connected to said axle, a cradle positioned in said box frame beneath said axle extending traversely to said width of said box frame and capable of vertical movement by means of an integrated lifting apparatus to support said axle and associated roll of belting.

2. The conveyor-belt reeling device as claimed in claim 1 wherein said axle is comprised of two oppositing U-shaped channel sectional beams; ends of said beams being disposed within recesses of similar shape and configuration provided within circular discs at said end of said axle whereupon withdrawal of said ends of said axle from said recesses allow said U-shaped channel sectional beams to come together for extraction from said roll of belting.

3. The conveyor-belt reeling device as claimed in claim 2 wherein said cradle is provided with inclined rollers to receive a completed roll of belting.

4. The conveyor-belt reeling device as claimed in claim 2 and further including a pair of horizontal rollers for guiding said belting during reeling.

5. The conveyor-belt reeling device as claimed in claim 4 wherein said pair of horizontal rollers are laterally adjustable to ensure that the resultant roll of belting is symmetrical.

6. The conveyor-belt reeling device as claimed in claim 2 wherein vertical movement of said cradle is effected by means of a combination of ropes and chains.

7. The conveyor-belt reeling device as claimed in claim 2 wherein said pivotal frame member is held in a closed position during reeling of said belt by pins engaging said pivotal frame member and a static member of said box frame structure.

* * * * *